3,068,194
STABILIZED SILICONE ELASTOMERS AND
PROCESS FOR THEIR PRODUCTION
Roscoe A. Pike, Grand Island, N.Y., assignor to Union
Carbide Corporation, a corporation of New York
No Drawing. Filed June 19, 1958, Ser. No. 742,995
17 Claims. (Cl. 260—45.9)

This invention relates to organosilicon compositions. More particularly, this invention relates to silicone elastomers that are protected against oxidation at elevated temperatures (i.e. stabilized) and to a process for the production of such elastomers.

Silicone elastomers are useful in many applications because of their desirable physical properties, such as their dielectric properties and thermal stability at moderate temperatures. However, silicone elastomers have been found to decompose when heated in air at elevated temperatures for prolonged periods of time, apparently due to an oxidation reaction. The temperature at which a silicone elastomer decomposes is dependent upon the organic substituents present in the gum from which it is produced. By way of illustration, a silicone elastomer produced from a gum composed of diethylsiloxy groups was found to decompose when heated at 150° C. for 6 hours, whereas a silicone elastomer produced from a gum composed of predominately dimethylsiloxy groups and small amounts of ethylvinylsiloxy groups was found to decompose when heated at 250° C. for 24 hours. The decomposition of silicone elastomers at elevated temperatures was found to result in the loss of desirable properties, such as a decrease in tensile strength.

Silicone elastomers are produced by curing organopolysiloxane gums, usually employing organic peroxides (most often benzoyl peroxide) as curing agents and carbonaceous or inorganic fillers. It has been proposed that the decomposition of silicone elastomers at elevated temperatures might be avoided by incorporating an organic antioxidant in an organopolysiloxane gum and then curing the gum using benzoyl peroxide as a curing agent. This proposal was not found satisfactory since organic antioxidants were found to react with the benzoyl peroxide used to cure the organopolysiloxane gum. Neither the antioxidant nor the benzoyl peroxide was then able to perform its intended function.

Another process that has been suggested to stabilize silicone elastomers involves applying a solution of an organic antioxidant dissolved in an organic solvent to an elastomer, allowing the solution to penetrate into the elastomer and then removing the solvent to produce an elastomer containing the antioxidant. This process was not found to be particularly useful since such solutions do not readily penetrate into the interior of silicone elastomers and so the antioxidant is not uniformly dispersed throughout the elastomer. Such solutions cause swelling of the silicone elastomers. In addition, it is difficult to precisely control the amount of the antioxidant incorporated in the elastomer by this process and it is difficult to entirely remove the solvent from the elastomer.

It has been recently found that stabilized silicone elastomers can be produced by a process that involves mixing an organopolysiloxane gum, an organic peroxide curing agent and an organic antioxidant that is retained by a zeolitic molecular sieve to form a curable gum compound and heating the gum compound so formed to a temperature sufficiently elevated to cure the gum compound to produce an elastomer. The zeolitic molecular sieves used in this process are crystalline metal-aluminum silicates and have been found to possess strong sorbtion properties by virtue of which they retain (i.e. absorb and/or adsorb) the organic antioxidant. The organic antioxidant so retained is prevented from reacting with the peroxide during curing. However, after curing, that is after the peroxide has effected curing and decomposed, the antioxidant can be released by heating the elastomer to a temperature above that normally used for curing and sufficiently elevated to release the antioxidant from the zeolitic molecular sieve. Although this process has proven useful in stabilizing silicone elastomers against decomposition at elevated temperatures and is most suitable for many applications, there are some instances in which the additional process step required (i.e. causing the organic antioxidant to be retained by the zeolitic molecular sieve) and an additional component (i.e. the zeolitic molecular sieve) are not commercially feasible.

This invention is based, in part, on the discovery that certain combinations of organic antioxidants and organic peroxide curing agents, specifically aryl amine antioxidants and dialkyl peroxide curing agents, when employed in certain relative amounts may be used in the production of stabilized silicone elastomers. It was found that when these combinations are used the antioxidant does not react with the curing agent.

This invention provides for the production of stabilized silicone elastomers by a process which involves mixing an organopolysiloxane gum containing monovalent olefinically unsaturated hydrocarbon groups attached to silicon atoms, an aryl amine antioxidant and a dialkyl peroxide curing agent in an amount larger than the amount of the antioxidant to form a curable gum compound and heating the curable gum compound to a temperature sufficiently elevated to cure the gum compound to produce an elastomer.

The starting organopolysiloxane gums used in this invention are copolymers that contain both of the siloxane groups represented by the formulae:

(1)

and

(2)

wherein R is a monovalent hydrocarbon group that is free of olefinic unsaturation and R' is a monovalent olefinically unsaturated hydrocarbon group. The ratio of the organic groups (i.e., monovalent hydrocarbon groups that are free of olefinic unsaturation and monovalent olefinically unsaturated hydrocarbon groups) to silicon atoms in the starting organopolysiloxane gums is from 1.95 to 2.05.

Illustrative of the monovalent olefinically unsaturated hydrocarbon groups that are represented by R' in Formula 1 are the alkenyl groups (for example the vinyl and the allyl group); and the cycloalkenyl groups (for example the cyclohexenyl group). The preferred monovalent olefinically unsaturated hydrocarbon group is the vinyl group.

Illustrative of the monovalent hydrocarbon groups that are free of olefinic unsaturation and that are represented by R in graphical Formulae 1 and 2 are the alkyl groups (for example the methyl, ethyl and propyl groups); the aryl groups (for example the phenyl group); the aralkyl groups (for example the benzyl and the phenylethyl groups); and the cycloalkyl groups (for example the cyclohexyl group).

Useful organopolysiloxane gums may contain siloxane groups that are represented by Formula 2 wherein either the same hydrocarbon groups are attached to the silicon atoms (e.g. the dimethylsiloxy, diphenylsiloxy and diethylsiloxy groups) or different hydrocarbon groups are attached to the silicon atoms (e.g. the methylphenylsiloxy, phenylethylmethylsiloxy and ethylsiloxy groups).

Useful starting organopolysiloxane gums contain one or more types of siloxane groups represented by Formula 1 and one or more types of siloxane groups represented by Formula 2. By way of illustration, one useful gum is composed of ethylvinylsiloxy groups and dimethylsiloxy groups; a second useful gum is composed of methylvinylsiloxy groups, phenylvinylsiloxy groups and dimethylsiloxy groups; and a third useful gum is composed of methylvinylsiloxy groups, dimethylsiloxy groups and diphenylsiloxy groups.

Silicon-bonded monovalent olefinically unsaturated hydrocarbon groups (i.e. groups represented by R' in Formula 1 react to produce crosslinks between the molecules of the starting gum through the agency of dialkyl peroxide curing agents. The relative amount of the siloxane groups represented by Formula 1 contained in the gum is that amount which provides the degree of crosslinking necessary to impart elastomeric properties to the cured product. The cured products produced from gums that contain an insufficient amount of groups represented by Formula 1 are soft and gummy rather than elastomeric. The cured products produced from the gums that contain an excessive amount of groups represented by Formula 1 are hard and brittle rather than elastomeric. Generally, amounts of siloxane groups represented by Formula 1 from 0.05 part to 3.0 parts by weight per 100 parts by weight of the siloxane groups in the gum usually provide the degree of crosslinking necessary to produce an elastomeric product. Preferably, the starting gum contains from 0.2 part to 0.4 part by weight of siloxane groups represented by Formula 1 per 100 parts by weight of the siloxane groups in the gum. Conversely, the gum may contain from 97.0 parts to 99.95 parts by weight but preferably contains from 99.6 parts to 99.8 parts by weight of siloxane groups represented by Formula 2 per 100 parts by weight of the siloxane groups in the gum.

Starting organopolysiloxane gums that are useful in this invention may be produced from chlorosilanes or alkoxysilanes by known hydrolysis, condensation and equilibration processes. Useful starting organopolysiloxane gums and processes for their production are described in U.S. patent application Serial Number 470,834, filed November 23, 1954. Due to the monoorganosilane impurities (e.g. methyltrichlorosilane) and triorganosilane impurities (e.g. trimethylchlorosilane) in the starting materials, such organopolysiloxane gums usually contain small amounts of monoorganosiloxy groups (e.g. monomethylsiloxy groups) and triorganosiloxy groups (e.g. trimethylsiloxy groups). Small amounts of the latter mentioned groups may present by design as end-blocking or chain terminating groups.

Useful starting organopolysiloxane gums may contain small amounts of organic end-blocking or chain terminating groups. By way of illustration, useful gums may contain small amounts of alkoxy end-blocking groups.

The antioxidants that are useful in this invention are aryl amines. Suitable aryl amines include monoaryl amines, diaryl amines and triarylamines. Illustrative of the antioxidants that are useful in this invention are diphenyl amine, N-phenyl-alpha-naphthylamine, N-phenyl-beta-naphthylamine, N,N'-bis-dinaphthyl-para-phenylene diamine, N,N'-diphenyl para-phenylene diamine, N,N'-di-(sec-butyl)p-phenylene diamine, di(2,4-diamino phenyl) amine, di(4-methoxyphenyl)amine, N,N'-di(2-octyl)p-phenylene diamine and N,N'-di(cyclohexylphenyl)p-phenylene diamine. The preferred antioxidants are diaryl amines, especially N,N'-bis-dinaphthyl-para-phenylene diamine. Apparently the stabilizing effect at elevated temperatures of the antioxidants used in this invention is due, at least in part, to the presence of an aryl group in the molecule of these antioxidants. Aliphatic compounds having amine groups were not found useful in stabilizing silicone elastomers at elevated temperatures. By way of illustration, triethanolamine was found to be ineffective in stabilizing silicone elastomers at elevated temperatures.

The amount of antioxidants used in this invention is not narrowly critical. The amount of the antioxidant used will vary depending on the sensitivity of the silicone elastomer to oxidation and on the temperature at which the silicone elastomer will be employed. In most cases, amounts of antioxidants of from 0.1 part by weight to 0.75 part by weight per 100 parts by weight of the organopolysiloxane gum are useful, but, amounts of antioxidants of from 0.4 part by weight to 0.5 part by weight per 100 parts by weight of the organopolysiloxane gum are preferred. The use of greater amounts of the antioxidants may result in some reaction of the antioxidants with the peroxide curing agent; and the use of lesser amounts of the antioxidants may result in inadequate stabilization of the silicone elastomer, especially when the elastomer is used at very high temperatures. However, other than the indicated amounts of antioxidant might be employed without any commensurate advantage being gained by so doing.

The curing agents that are useful in this invention are dialkyl peroxides. The peroxides may be represented by the formula:

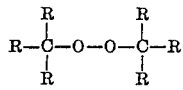

(3)

wherein R is a hydrocarbon group that is free of olefinic unsaturation as defined for Formula 2. Preferably R in Formula 3 is an alkyl group containing from 1 to 3 carbon atoms (i.e. the methyl, ethyl and propyl groups) or a phenyl group. The groups represented by R in Formula 3 may be the same or different. Illustrative of curing agents that are useful in this invention are di(tert-butyl)peroxide and dicumylperoxide. Di(tert-butyl) peroxide is especially useful.

The amount of the dialkyl peroxide used as a curing agent in this invention is not narrowly critical. The curing agent is usually employed in at least stoichiometric or chemically equivalent amounts, plus when necessary or desirable, a slight excess sufficient to compensate for any volatilization of the curing agent that may occur during curing. Thus, two moles of the curing agent might be used to cure a gum whose average composition corresponds to one mole of an organopolysiloxane containing two organic groups represented by R' in Formula 1 per molecule. In practice, the useful amount of the curing agent was found to vary from 0.1 part by weight to 4 parts by weight of the peroxide per 100 parts by weight of the organopolysiloxane gum. However, it is preferable to use from 0.5 part by weight to 1.0 part by weight of the peroxide per 100 parts by weight of the organopolysiloxane gum. The use of greater amounts of the curing agent may result in the reaction of the curing agent with the antioxidant; and the use of lesser amounts of the curing agent may result in an inadequate curing of the organopolysiloxane gum.

It was found that attempts to produce satisfactory silicone elastomers from mixtures containing an organopolysiloxane gum, a dialkyl peroxide curing agent and an aryl amine antioxidant were unsuccessful when the antioxidant was present in the mixture in an amount equal to or greater than the amount of the curing agent. Apparently the antioxidant and the curing agent react when the antioxidant is present in an amount equal to or greater than the amount of the curing agent. Hence, the curable gum compounds of this invention contain more curing agent than antioxidant on a weight basis. Amounts of antioxidants of from 0.2 part to 0.9 part by weight per part by weight of the curing agent are useful but amounts of antioxidant of from 0.5 part to 0.7 part by weight per part by weight of the curing agent are preferred. Other organic antioxidant-organic peroxide curing agent combinations (such as a combination of a hydroxy substituted aromatic compound as an antioxidant and dialkyl peroxide curing agent or a combination of an aryl amine antioxidant and a diacyl peroxide curing agent) were found to react and so are not useful in curable gum compounds when used in any relative amounts.

In producing the stabilized silicone elastomers of this invention, a curable gum compound is formed containing an organopolysiloxane gum, an aryl amine antioxidant and a dialkyl peroxide curing agent. As used herein the phrase, "curable gum compound" denotes a mixture that can be cured to produce a silicone elastomer. These mixtures may be formed in known apparatus such as two-roll rubber mills and the like employing the above-indicated amounts of the gum, the antioxidant and the curing agent. Preferably, the antioxidant is first mixed with the organopolysiloxane gum and then the peroxide is added.

In the practice of this invention a uniform dispersion of the antioxidant throughout the organopolysiloxane gum and, consequently, the production of a silicone elastomer containing uniformly dispersed antioxidant is readily achieved since the gum is in a plastic and easily workable state. The amounts of the antioxidant may be added in its pure form, no solvent being required. These desirable features are not obtainable by known processes for incorporating organic antioxidants in silicone elastomers i.e. applying a solution containing an organic antioxidant and an organic solvent to a cured elastomer.

A filler is usually used in the curable compounds of this invention. The fillers that are useful in this invention include acidic fillers (such as uncoated finely divided silica), basic fillers (such as carbon black and alumina) and neutral fillers (such as quartz, coated finely divided silica, calcium carbonate and diatomaceous earth). These fillers impart desirable physical properties (e.g. high tensile strength) to silicone elastomers.

The effectiveness of dicumyl peroxide as a curing agent is impaired when it is used in curable gum compounds containing silica (or other acidic fillers) as the sole filler. Hence, when dicumyl peroxide is employed as a curing agent, neutral fillers, basic fillers or mixtures of acidic fillers and neutral or basic fillers are used. Di(tert-butyl) peroxide was found to be an effective curing agent with all of the fillers found useful in this invention.

The amount of the filler used in this invention is not narrowly critical and may range from 25 parts to 65 parts by weight of the filler per 100 parts by weight of the organopolysiloxane gum. Preferably from 35 parts to 45 parts by weight of the filler per 100 parts by weight of the gum are employed.

It is often advantageous to preblend the filler and the organopolysiloxane gum and allow the mixture to bin age. This procedure promotes wetting of the filler by the gum. Then the antioxidant and the curing agent may be mixed with the preblended filler and gum to produce a curable gum compound.

The coated finely divided silicas that may be blended with the curable mixtures used in this invention include those coated silicas that contain alkoxy groups attached to the silicon atoms on the surface of the silica. It has been found that such coated silicas, although usually susceptible to decomposition at high temperatures, are stabilized by the antioxidants used in this invention.

A curable gum compound of this invention containing no filler may be applied to a fibrous material and cured thereon to produce an elastomer. In such cases the elastomer has physical properties comparable to an elastomer produced from a curable gum compound containing a filler. Apparently the fibrous material functions as a filler.

In the practice of this invention a curable gum compound containing an organopolysiloxane gum, an amine antioxidant and a dialkyl peroxide curing agent is cured by heating the gum compound. The gum compound may be heated by various known means, such as in a slab mold. The gum compound may be cured by heating to a temperature of from 110° C. to 200° C. but the preferred curing temperature is from 170° C. to 180° C. The curable gum compound may be maintained at the curing temperature for from 5 minutes to 30 minutes but preferably for from 15 minutes to 20 minutes. Heating the gum compound to other temperatures for other periods of time may accomplish the cure of the mixture, since the particular temperature and time used is not narrowly critical, but no particular advantage is gained by departing from the indicated temperature and time ranges.

The stabilized silicone elastomers of this invention are useful in the various applications where known silicone elastomers are used and are particularly useful in high temperature applications where known silicone elastomers would decompose and lose their desirable properties. By way of illustration, the stabilized silicone elastomers of this invention are uniquely suited for service in high temperature environments such as may be encountered by oven seals, coatings for electrical conductors, steam heated rolls for paper mills, glass to metal sealants for arc lamps and hoses for jet engines. The stabilized silicone elastomers of this invention produced from gums containing 0.35 part by weight of ethylvinylsiloxy groups and 99.65 parts by weight of dimethylsiloxy groups per 100 parts by weight of the siloxane groups in the gum may be used at temperatures of from 250° C. to 350° C. without appreciable loss of their physical properties.

Known heat aging tests may be used to determine the stability of the stabilized silicone elastomers of this invention. By way of illustration, the latter mentioned silicone elastomer may be heat aged by maintaining the elastomer at a temperature of from 250° C. to 315° C. for from 24 hours to 96 hours. The retention of satisfactory physical properties (such as tensile strength, elongation, set at break, hardness) by the heat aged elastomer indicates its stability. Stabilized silicone elastomers of this invention, when heat aged in this manner, were found to retain satisfactory physical properties.

The following examples illustrate the present invention.

The conditions used in Examples I to IX and the physical properties of the cured and heat aged products of Examples I to IX are tabulated on Table I.

EXAMPLE I

A curable gum compound was formed on a conventional two roll, six inch rubber mill. The gum compound contained the following components: 100 parts by weight of dimethylpolysiloxane gum, 40 parts by weight of finely divided silica ("Santocel CS"), 0.5 part by weight of phenyl-beta-naphthylamine and 0.8 part by weight of di(tert-butyl) peroxide. The dimethylpolysiloxane gum contained 0.35 part by weight of ethylvinylsiloxy groups and 99.65 parts by weight dimethylsiloxy groups per 100 parts by weight of the siloxane groups in the gum. The gum and the silica had been preblended and bin aged. The gum compound so formed was cured in a conventional slab mold by heating for twenty minutes at 174° C. to produce an elastomer. The elastomer was heat aged by heating the elastomer for 24 hours at 250° C. (see Table I, references A and B).

EXAMPLE II

Following the procedure used in Example I, another elastomer was prepared. The curable gum compound that was used was the same as the gum compound used in Example I except that phenyl-alpha-naphthylamine was used as an antioxidant in place of phenyl-beta-naphthylamine (see Table I, references C and D).

EXAMPLE III

On a conventional two roll, six inch rubber mill the following curable gum compound was formed: 100 parts by weight of dimethylpolysiloxane gum, 0.5 part by weight of phenyl-beta-naphthylamine, 40 parts by weight of finely divided silica ("Santocel CS") and 0.8 part by weight of di(tert-butyl) peroxide. The dimethylpolysiloxane gum contained 0.35 part by weight of ethylvinylsiloxy groups and 99.65 parts by weight of dimethylsiloxy groups per 100 parts by weight of the siloxane groups in the gum. The gum and the finely divided silica had been pre-mixed and allowed to age for four months. The gum compound so formed was cured by heating for twenty minutes at 174° C. to produce an elastomer. One part of the elastomer so produced was heat aged by heating for 24 hours at 250° C. (see Table I, references E and F). A second part of the elastomer was heat aged by heating for 24 hours at 315° C. (see Table I, reference G). A third part of the elastomer was heat aged by heating for 96 hours at 315° C. and was found to be too brittle to test (see Table I, reference H).

EXAMPLE IV

A curable gum compound was formed on a conventional two roll, six inch rubber mill. The gum compound contained the following components: 100 parts by weight of dimethylpolysiloxane gum, 40 parts by weight of finely divided silica ("Hi-Sil-X-303") and 0.8 part by weight of di(tert-butyl) peroxide. The dimethylpolysiloxane gum contained 0.35 part by weight of ethylvinylsiloxy groups and 99.65 parts by weight of dimethylsiloxy groups per 100 parts by weight of the siloxane groups in the gum. The gum and the silica had been preblended and bin aged for 4 months. No antioxidant was present in the mixture. The gum compound so formed was cured by heating for twenty minutes at 174° C. to produce an elastomer. The elastomer exhibited poor properties after being heat aged by heating at 250° C. for 24 hours and, after being heat aged by heating at 315° C. for 24 hours, it was too brittle to test. The heat aging indicated the need for the presence of antioxidants to stabilize silicone elastomers at elevated temperatures (see Table I, references I, J and K).

EXAMPLE V

A curable gum compound was formed on a conventional two roll, six inch rubber mill. The gum compound contained the following components: 100 parts by weight of dimethylpolysiloxane gum, 0.8 part by weight of di(tert-butyl) peroxide, 0.5 part by weight of N,N'-bis-dinaphthyl-para-phenylene diamine and 40 parts by weight of finely divided silica ("Santocel CS"). The dimethylpolysiloxane gum contained 0.35 part by weight of ethylvinylsiloxy groups and 99.65 parts by weight of dimethylsiloxy groups per 100 parts by weight of the siloxane groups in the gum. The gum and the finely divided silica had been preblended and aged for four months. The gum compound so formed was cured in a conventional slab mold by heating for twenty minutes at 174° C. to produce an elastomer. One part of the elastomer so obtained was heat aged by heating the product for 24 hours at 250° C. A second part of the elastomer was heat aged by heating for 24 hours at 315° C. A third part of the elastomer was heat aged by heating for 96 hours at 315° C. (see Table I, references L, M, N and O).

EXAMPLE VI

Using the procedure used in Example V, another silicone elastomer was produced and then heat aged. The curable gum compound used in producing this elastomer contained the following components: 100 parts by weight of dimethylpolysiloxane gum, 40 parts by weight of finely divided silica ("Hi-Sil-X-303"), 0.5 part by weight of N,N'-bis-dinaphthyl-para-phenylene diamine and 0.8 part by weight of di-(tert-butyl) peroxide. The dimethylpolysiloxane gum contained 0.35 part by weight of ethylvinylsiloxy groups and 99.65 parts by weight of dimethylsiloxy groups per 100 parts by weight of the siloxane groups in the gum. The gum and the silica had been preblended and bin aged for four months (see Table I, references P, Q, R and S).

EXAMPLE VII

A gum compound was formed on a conventional two roll, six inch rubber mill. The gum compound contained the following components: 100 parts by weight of dimethylpolysiloxane gum, 40 parts by weight of finely divided silica ("Santocel CS"), 2.0 parts by weight of benzoyl peroxide and 0.5 part by weight of phenyl-beta-naphthylamine. The gum compound turned brown while being mixed in the mill. The sheet produced in the mill was heated with a conventional slab mold for twenty minutes at 125° C. Very little cure was obtained indicating that diacyl peroxide curing agents and aryl amine antioxidants cannot be used together in producing a satisfactory silicone elastomer (see Table I, reference T).

EXAMPLE VIII

A curable gum compound was formed on a conventional two roll, six inch rubber mill. The gum compound contained the following components: 100 parts by weight of dimethylpolysiloxane gum, 60 parts by weight of finely divided coated silica ("Valron"), 0.5 part by weight of phenyl-beta-naphthylamine and 0.8 part by weight of di(tert-butyl) peroxide. The dimethylpolysiloxane gum contained 0.35 part by weight of ethylvinylsiloxy groups and 99.65 parts by weight of dimethylsiloxy groups per 100 parts by weight of the siloxane groups in the gum. The finely divided coated silica contained butoxy groups attached to some of the silicon atoms on its surface. The sheet so produced was mold cured in a conventional slab mold by heating the sheet for twenty minutes at 174° C. The cured sheet so produced was heat aged by heating in a forced-draft oven for six hours at 150° C., then for seven hours at 200° C., and finally for 24 hours at 250° C. (see Table I, references U, V, W and X).

EXAMPLE IX

A curable gum compound was formed on a conventional two roll, six inch rubber mill. The gum compound contained the following components: 100 parts by weight of dimethylpolysiloxane gum, 60 parts by weight of finely divided coated silica ("Valron") and 0.8 part by weight of benzoyl peroxide. The finely divided coated silica contained butoxy groups attached to some of the silicone atoms on its surface. The sheet so produced was mold cured in a conventional slab mold by heating the sheet for twenty minutes at 174° C. The cured sheet so produced was heat aged by heating in a forced-draft oven for six hours at 250° C. (see Table I, references Y and Z). The heat aged elastomer could not be tested indicating the need for the presence of antioxidants to stabilize elastomers containing coated silica at elevated temperatures.

EXAMPLE X

A gum compound was formed on a conventional two roll, six inch rubber mill. The gum compound contained the following components: 100 parts by weight of dimethylpolysiloxane gum, 40 parts by weight of finely divided silica ("Santocel CS"), 0.8 part by weight of di(tert-butyl) peroxide and 0.5 part by weight of 2,6-di-tert-butyl-4-methyl phenol. The dimethylpolysiloxane gum contained 0.35 part by weight of ethylvinylsiloxy groups and 99.65 parts by weight of dimethylsiloxy groups per 100 parts by weight of the siloxane groups in the gum. The gum and the finely divided silica had been preblended and aged. The gum compound so produced was cured in a conventional slab mold by heating for twenty minutes at 174° C. Very little cure was obtained, indicating that dialkyl peroxide curing agents and phenol antioxidants cannot be used together in producing silicone elastomers.

EXAMPLE XI

The curable gum compound was formed on a conventional two roll, six inch rubber mill. The gum compound contained the following components: 100 parts by weight of diethylpolysiloxane gum, 50 parts by weight of finely divided silica ("Hi-Sil-X-303") and 2.5 parts by weight of benzoyl peroxide. The gum and the finely divided silica had been preblended and bin aged. The gum compound so produced was cured by heating in a conventional slab mold for sixteen minutes at 125° C. to produce an elastomer. Part of the elastomer was heat aged by heating the elastomer for six hours at 150° C. The elastomer was then too brittle to test, indicating the need for an antioxidant to stabilize elastomer produced from gums composed of diethylsiloxy groups.

than the amount of the antioxidant to form a curable gum compound and heating the curable gum compound to a temperature sufficiently elevated to cure the gum compound to produce an elastomer.

2. The process of claim 1 wherein R' is a vinyl group.
3. The process of claim 1 wherein the aryl amine antioxidant is a diaryl amine.
4. The process of claim 1 wherein the aryl amine antioxidant is N,N'-bis-dinaphthyl-para-phenylene diamine.
5. The process of claim 1 wherein the dialkyl peroxide curing agent is represented by the formula:

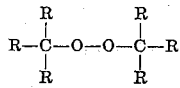

wherein R is a member selected from the group consisting of the alkyl groups containing from 1 to 3 carbon atoms and the phenyl group.

Table I

| Ref. | Antioxidant Type | Antioxidant Amount a | Peroxide | Heating Temp. (° C.) | Heating Time (hrs.) | Tensile (p.s.i.) | Elongation (percent) | Set at Break (percent) | Hardness (Shore A) |
|---|---|---|---|---|---|---|---|---|---|
| A | PBNA b | 0.5 | DTBP c | 174 | d ⅓ | 871 | 575 | 5 | 53 |
| B | PBNA | 0.5 | DTBP | 250 | h 24 | 745 | 375 | 0 | 64 |
| C | PANA e | 0.5 | DTBP | 174 | d ⅓ | 854 | 650 | 10 | 48 |
| D | PANA | 0.5 | DTBP | 250 | h 24 | 800 | 400 | 0 | 64 |
| E | PBNA | 0.5 | DTBP | 174 | d ⅓ | 890 | 500 | 0 | 36 |
| F | PBNA | 0.5 | DTBP | 250 | h 24 | 833 | 325 | 0 | 42 |
| G | PBNA | 0.5 | DTBP | 315 | h 24 | 500 | 110 | 0 | 56 |
| H | PBNA | 0.5 | DTBP | 315 | h 96 | Too brittle to test | | | |
| I | None | | DTBP | 174 | d ⅓ | 883 | 310 | 2 | 44 |
| J | None | | DTBP | 250 | h 24 | 587 | 150 | 0 | 53 |
| K | None | | DTBP | 315 | h 24 | Too brittle to test | | | |
| L | DNPD f | 0.5 | DTBP | 174 | d ⅓ | 872 | 350 | 0 | 51 |
| M | DNPD | 0.5 | DTBP | 250 | h 24 | 865 | 400 | 2 | 41 |
| N | DNPD | 0.5 | DTBP | 315 | h 24 | 548 | 90 | 0 | 63 |
| O | DNPD | 0.5 | DTBP | 315 | h 96 | 640 | 75 | 0 | 76 |
| P | DNPD | 0.5 | DTBP | 174 | d ⅓ | 789 | 425 | 10 | 35 |
| Q | DNPD | 0.5 | DTPB | 250 | h 24 | 831 | 325 | 0 | 47 |
| R | DNPD | 0.5 | DTBP | 315 | h 24 | 480 | 75 | 0 | 66 |
| S | DNPD | 0.5 | DTBP | 315 | h 96 | 548 | 60 | 0 | 80 |
| T | PBNA | 0.5 | BP g | 125 | d ⅓ | Very little cure obtained | | | |
| U | PBNA | 0.5 | DTBP | 174 | d ⅓ | 1247 | 725 | 25 | 58 |
| V | PBNA | 0.5 | DTBP | 150 | h 6 | 1796 | 650 | 20 | 71 |
| W | PBNA | 0.5 | DTBP | 200 | h 7 | 817 | 250 | 0 | 82 |
| X | PBNA | 0.5 | DTBP | 250 | h 24 | 879 | 25 | 0 | 93 |
| Y | None | | BP | 174 | d ⅓ | | | | |
| Z | None | | BP | 250 | h 6 | Too brittle to test | | | | a The amount of antioxidant is given as parts by weight per 100 parts by weight of the organopolysiloxane gum.
b PBNA is phenyl-beta-naphthylamine.
c DTBP is di(tert-butyl) peroxide.
d Mold cure.
e PANA is phenyl-alpha-naphthylamine.
f DNPD is N-N'-bis-dinaphthyl-para-phenylene diamine.
g BP is benzoyl peroxide.
h Heat aging.

What is claimed is:

1. A process for producing stabilized silicone elastomers which comprises mixing an organopolysiloxane gum composed of siloxane groups represented by the formula:

wherein R is a monovalent hydrocarbon group that is free of olefinic unsaturation and R' is a monovalent olefinically unsaturated hydrocarbon group said siloxane groups being present in an amount that provides sufficient monovalent olefinically unsaturated hydrocarbon groups to crosslink the gum to produce an elastomer when the gum is cured, and siloxane groups represented by the formula:

wherein R is a monovalent hydrocarbon group that is free of olefinic unsaturation, an aryl amine antioxident and a dialkyl peroxide curing agent in an amount larger 6. The process of claim 1 wherein the dialkyl peroxide curing agent is di(tert-butyl) peroxide.
7. The process of claim 1 wherein the aryl amine antioxidant is present in an amount of from 0.2 part to 0.9 part by weight per part by weight of the dialkyl peroxide curing agent.
8. The process of claim 1 wherein the aryl amine antioxidant is present in an amount of from 0.5 part to 0.7 part by weight per part by weight of the dialkyl peroxide curing agent.
9. The process of claim 1 wherein a filler is mixed with the gum, the antioxidant and the curing agent to form the curable gum compound.
10. A curable gum compound comprising an organopolysiloxane gum composed of siloxane groups represented by the formula:

wherein R is a monovalent hydrocarbon group that is free of olefinic unsaturation and R' is a monovalent olefinically unsaturated hydrocarbon group said siloxane groups being present in an amount that provides sufficient monovalent olefinically unsaturated hydrocarbon groups to crosslink the gum to produce an elastomer when the gum is cured, and siloxane groups represented by the formula:

$$-\underset{\underset{R}{|}}{\overset{\overset{R}{|}}{Si}}O-$$

wherein R is a monovalent hydrocarbon group that is free of olefinic unsaturation, an aryl amine antioxidant and a dialkyl peroxide curing agent in an amount larger than the amount of the antioxidant.

11. The curable gum compound of claim 10 containing a filler.

12. The curable gum compound of claim 10 wherein the group represented by R' is a vinyl group.

13. The curable gum compound of claim 10 wherein the dialkyl peroxide curing agent is di(tert-butyl) peroxide.

14. The curable gum compound of claim 10 wherein the aryl amine is N,N'-bis-dinaphthyl-para-phenylene diamine.

15. The curable gum compound of claim 10 wherein the aryl amine antioxidant is present in an amount of from 0.2 part to 0.9 part by weight per 100 parts by weight of the dialkyl peroxide curing agent.

16. A stabilized silicone elastomer containing a uniformly dispersed aryl amine antioxidant produced from a curable gum compound comprising an organopolysiloxane gum composed of siloxane groups represented by the formula:

$$-\underset{\underset{R'}{|}}{\overset{\overset{R}{|}}{Si}}O-$$

wherein R is a monovalent hyrdocarbon group that is free of olefinic unsaturation and R' is a monovalent olefinically unsaturated hydrocarbon group said siloxane groups being present in an amount that provides sufficient monovalent olefinically unsaturated hydrocarbon groups to crosslink the gum to produce an elastomer when the gum is cured, and siloxane groups represented by the formula:

$$-\underset{\underset{R}{|}}{\overset{\overset{R}{|}}{Si}}O-$$

wherein R is a monovalent hydrocarbon group that is free of olefinic unsaturation, an aryl amine antioxidant and a dialkyl peroxide curing agent in an amount larger than the amount of the antioxidant.

17. A stabilized silicone elastomer containing a uniformly dispersed diaryl amine antioxidant produced from a curable gum compound comprising an organopolysiloxane gum composed of siloxane groups represented by the formula:

$$-\underset{\underset{R'}{|}}{\overset{\overset{R}{|}}{Si}}O-$$

wherein R is a monovalent hydrocarbon group that is free of olefinic unsaturation and R' is a monovalent olefinically unsaturated hydrocarbon group said siloxane groups being present in an amount that provides sufficient monovalent olefinically unsaturated hydrocarbon groups to crosslink the gum to produce an elastomer when the gum is cured, and siloxane groups represented by the formula:

$$-\underset{\underset{R}{|}}{\overset{\overset{R}{|}}{Si}}O-$$

wherein R is a monovalent hydrocarbon group that is free of olefinic unsaturation, a diaryl amine antioxidant and a dialkyl peroxide curing agent in an amount larger than the amount of the antioxidant.

References Cited in the file of this patent

UNITED STATES PATENTS

| | | |
|---|---|---|
| 2,389,802 | McGregor | Nov. 27, 1945 |
| 2,557,928 | Atkinson | June 26, 1951 |
| 2,697,114 | Chenicek | Dec. 14, 1954 |
| 2,714,099 | Weyenberg | July 26, 1955 |